Patented June 30, 1931

1,812,284

UNITED STATES PATENT OFFICE

AMERIGO F. CAPRIO, OF NEWARK, NEW JERSEY, ASSIGNOR TO CELLULOID CORPORATION, A CORPORATION OF NEW JERSEY

MANUFACTURE OF COLORED IMITATION MOTHER OF PEARL

No Drawing. Original application filed December 27, 1926, Serial No. 157,431. Divided and this application filed January 26, 1928. Serial No. 249,775.

This invention relates to the manufacture of decorated plastic materials employing a base of which celluloid is an example, and to an improved method of making such materials. More particularly, this invention relates to colored imitations of mother of pearl and various objects characterized by a scintillating, lustrous metallic or nacreous appearance. One object of the present invention is to produce economically materials of this character which will retain their appearance permanently.

In the manufacture of imitations of mother of pearl, attempts have been made to use a pearl essence consisting of brilliant particles of fish scales incorporated in a plastic substance having a cellulosic base. The comparative high cost of this essence has restricted its use; and instigated a search for cheaper substitutes. Moreover in the production of mother of pearl objects having a "mosaic gold" appearance, the use of dyes or coloring matters in the plastic substance containing pearl essence fails to give the proper hue or metallic gold effect desired.

In accordance with my invention, I incorporate into a base of plastic material certain colored metallic salts, as distinguished from metals or alloys, particularly such salts as may be obtained in the form of fine, silky, golden colored scales; for example, certain salts of lead, tin or the like. As specific examples I may use bisulphuret of tin, ($SnS_2$), or preferably iodide of lead ($PbI_2$), which is a heavy bright yellow powder without odor or taste, permanent in the air and soluble in about 1300 parts of water at 25° C. and in about 200 parts of boiling water, separating from the latter solution on cooling in brilliant, silky, golden yellow crystalline laminæ, very slightly soluble in alcohol. The lustrous scales can also be produced by triturating ordinary lead iodide powder in a small quantity of water to which ammonium chloride has been added, heating to boiling point and allowing the colorless solution to cool with the addition of water or other liquids. Using the first method, the size of the "golden" particles may be controlled largely by the concentration, rate of cooling, and presence of colloidal agents, such as gum acacia, gelatin, etc. A satisfactory procedure for preparing the fine scales of lead iodide is as follows:

One part of ordinary lead iodide is dissolved in five hundred parts of boiling water. Ten parts of a one percent aqueous solution of gum acacia are added. The solution is then suddenly cooled with vigorous agitation. The fine silky crystals of lead iodide separate out and are removed and freed if necessary from water by washing with ethyl alcohol, methyl alcohol or the like. Owing to its insoluble character, the wet lead iodide scales may also be dispersed in other organic liquids or solvents for pyroxylin, cellulose acetate, cellulose ethers or the like, which may be used for making the gold colored artificial pearl essence. Such an essence for example, may be made by the incorporation of 25 parts of lead iodide with 100 to 150 parts of a mixture of equal parts of ethyl alcohol, methyl alcohol and amyl acetate into which are dissolved ten to 15 parts of pyroxylin or more. This essence or solution can then be employed for the production of decorative plastic materials by anyone of a number of methods now practiced by those skilled in the art of using fish scales essence or other substitutes. The essence of lead iodide and cellulose ester may also be employed for example in the manufacture of colored imitation pearls, by coating beads or the like in a manner well known in the art. In other words, I include in my invention combinations from liquid solutions, such as varnishes or dopes, to the more solid masses manipulated in rolls and presses.

In the production of decorative plastic materials the gold colored pearl essence may be incorporated in the plastic substance itself while in the course of rolling or "converting" or in a solution of the same which is then flowed on a film wheel similar to the manner used in the manufacture of cinematographic film. A suspension of scales can also be applied to the surfaces of sheets of plastic masses.

The films or layers containing the scales are then superposed and welded or flowed together in the usual manner by heat and pressure. Sheets of suitable thickness are then cut, polished and mounted on different colored backgrounds to produce various decorative configurations. Different colored effects may also be produced by the use of dyes or coloring matters in the plastic material itself. The proportions employed are about one to two parts of the lead iodide to 100 parts of pyroxylin, but I do not limit myself to these proportions as more or less may be used, depending upon the effect to be obtained; but, in general, the above proportions will produce satisfactory results.

Other methods of incorporating compounds of this character into plastic masses will suggest themselves to those skilled in the art.

While I have referred to the plastic employed as pyroxylin, it is to be understood that other materials may be employed in place of pyroxylin, such, for example, as other compounds of cellulose such as acetyl cellulose, cellulose ethers and other plastic materials such as those made with gelatin, casein, formaldehyde condensation products, or other synthetic resins.

This application is a division of my copending application Serial No. 157,431, filed December 27, 1926, for manufacture of colored imitation mother of pearl.

I claim:

1. A liquid pyroxylin composition adapted for coating material or articles comprising approximately 25 parts of silky lead iodide, ten to fifteen parts of pyroxylin and 100 to 150 parts of a volatile solvent for the pyroxylin.

2. A process for the manufacture of a liquid composition for making colored imitations of nacreous objects which comprises producing an imitation pearl essence by the separation from aqueous solution of a lustrous, silky variety of lead iodide, and in incorporating this lead iodide into a liquid comprising a volatile solvent and a plastic substance.

3. A liquid composition adapted for producing decorative effects comprising silky lead iodide, a plastic substance and a volatile solvent for said plastic substance.

4. A liquid composition for producing decorative effects comprising silky lead iodide, a plastic subtance and a larger proportion of a volatile solvent for the plastic substance, than of the plastic substance.

AMERIGO F. CAPRIO.